United States Patent
Gosselin et al.

(10) Patent No.: US 12,024,285 B1
(45) Date of Patent: Jul. 2, 2024

(54) MODULAR MOBILITY SYSTEM INCLUDING THRUSTERS MOVABLY CONNECTED TO A SUPPORT STRUCTURE

(71) Applicant: Skypad Tech, Inc., Hampton, NH (US)

(72) Inventors: Christopher Gosselin, Hampton, NH (US); Glenn Bartels, Jr., Bastrop, TX (US); Grant Wilk, Hampton, NH (US)

(73) Assignee: Skypad Tech, Inc., Hampton, NH (US)

( * ) Notice: Subject to any disclaimer, the term of this patent is extended or adjusted under 35 U.S.C. 154(b) by 0 days.

(21) Appl. No.: 18/458,902

(22) Filed: Aug. 30, 2023

Related U.S. Application Data (63) Continuation of application No. 18/180,756, filed on Mar. 8, 2023.

(60) Provisional application No. 63/269,162, filed on Mar. 10, 2022.

(51) Int. Cl.
| | |
|---|---|
| *B64C 39/02* | (2023.01) |
| *B60L 50/00* | (2019.01) |
| *B64C 15/02* | (2006.01) |
| *B64D 27/24* | (2006.01) |

(52) U.S. Cl.
CPC ............ *B64C 39/026* (2013.01); *B60L 50/00* (2019.02); *B64C 15/02* (2013.01); *B64D 27/24* (2013.01); *B60L 2200/10* (2013.01)

(58) Field of Classification Search
CPC ....... B64C 15/02; B64C 39/026; B60L 50/00; B60L 2200/10; B64D 27/24
USPC ......................................................... 244/62
See application file for complete search history.

(56) References Cited

U.S. PATENT DOCUMENTS

| | | | |
|---|---|---|---|
| 2,417,896 A | 3/1947 | Zimmerman | |
| 2,547,266 A | 4/1951 | Hoglin | |
| 2,943,816 A | 7/1960 | Hiller, Jr. | |
| 2,953,321 A | 9/1960 | Robertson et al. | |
| 3,021,095 A | 2/1962 | Moore | |
| 3,023,980 A | 3/1962 | Martin et al. | |
| 3,107,069 A | 10/1963 | Draim | |
| 3,149,798 A | 9/1964 | Moore | |
| 3,149,799 A * | 9/1964 | Hulbert | B64C 39/026 244/4 A |
| 3,184,183 A | 5/1965 | Plasecki | |
| 3,243,144 A | 3/1966 | Hulbert et al. | |
| 3,277,858 A | 10/1966 | Athey | |
| 3,381,917 A * | 5/1968 | Moore | B63B 34/15 244/4 A |
| 3,416,753 A | 12/1968 | Hulbert | |

(Continued)

OTHER PUBLICATIONS

"DARPA's Electric Jetpack Program Heads to Prototyping Phase", Aviation Week Network, Jun. 7, 2022, Retrieved from: https://aviationweek.com/defense-space/aircraft-propulsion/darpas-electric-jetpack-program-heads-prototyping-phase.

(Continued)

*Primary Examiner* — Brady W Frazier
(74) *Attorney, Agent, or Firm* — KPPB LLP (57) ABSTRACT

Systems and methods for providing a mobility system with modular adaptability. Many embodiments incorporate a number of different electric thrusters that can provide the vertical and horizontal thrust necessary to achieve flight mobility for a given payload. Additionally, many embodiments allow for modular elements to be connected and disconnected for different flight missions such as longer sustained horizontal flight with fixed wing elements. Some embodiments may be adaptable to carry a human payload and controller.

7 Claims, 11 Drawing Sheets

(56) References Cited

U.S. PATENT DOCUMENTS

| | | | | |
|---|---|---|---|---|
| 3,434,290 | A | 3/1969 | Cresswell | |
| 3,443,775 | A | 5/1969 | Williams | |
| 3,474,987 | A | 10/1969 | Meditz | |
| RE26,756 | E | 1/1970 | Moore et al. | |
| 3,506,221 | A | 4/1970 | Caillette et al. | |
| 3,556,438 | A * | 1/1971 | Meditz | B64C 39/026 244/17.23 |
| 3,558,079 | A | 1/1971 | Curriston | |
| 3,559,922 | A | 2/1971 | Gluhareff | |
| 3,570,785 | A | 3/1971 | Croft et al. | |
| 3,614,030 | A | 10/1971 | Moller | |
| 3,662,973 | A | 5/1972 | Paine | |
| 4,253,625 | A | 3/1981 | Dmitrowsky | |
| 4,379,532 | A | 4/1983 | Dmitrowsky | |
| 4,447,024 | A | 5/1984 | Williams | |
| 4,457,476 | A | 7/1984 | Andresevitz | |
| 4,461,436 | A | 7/1984 | Messina | |
| 4,778,128 | A | 10/1988 | Wright et al. | |
| 4,824,048 | A | 4/1989 | Kim | |
| 4,934,629 | A | 6/1990 | Brant | |
| 5,094,157 | A | 3/1992 | Challis et al. | |
| 5,115,996 | A | 5/1992 | Moller | |
| 5,779,188 | A * | 7/1998 | Frick | B64C 39/026 244/23 B |
| 6,178,741 | B1 | 1/2001 | Nelson et al. | |
| 6,203,027 | B1 | 3/2001 | Ishikawa et al. | |
| D445,086 | S | 7/2001 | Moshier | |
| 6,488,232 | B2 | 12/2002 | Moshier | |
| D496,606 | S | 9/2004 | Sanders | |
| D496,900 | S | 10/2004 | Bulaga | |
| 6,874,728 | B2 * | 4/2005 | Lau | B64C 15/02 244/4 A |
| 6,969,027 | B2 | 11/2005 | Ishiba | |
| 7,077,358 | B1 | 7/2006 | Quartarone | |
| 7,182,295 | B2 | 2/2007 | Redmond | |
| 7,258,301 | B2 | 8/2007 | Li | |
| 7,484,687 | B2 * | 2/2009 | Martin | B64D 35/04 244/4 A |
| 7,581,608 | B2 | 9/2009 | St. Louis | |
| 7,980,522 | B2 | 7/2011 | Anderson et al. | |
| 8,336,805 | B1 * | 12/2012 | Zapata | B63H 11/113 244/4 A |
| 8,590,828 | B2 | 11/2013 | Marcus | |
| 8,608,103 | B2 | 12/2013 | Martin et al. | |
| 8,608,104 | B2 | 12/2013 | Zapata | |
| 8,651,432 | B2 | 2/2014 | De Roche | |
| 8,695,916 | B2 * | 4/2014 | Martin | B64C 39/026 244/4 A |
| 8,746,613 | B2 | 6/2014 | Suchezky et al. | |
| D714,086 | S | 9/2014 | Li et al. | |
| D716,065 | S | 10/2014 | Hubbard, Jr. | |
| 8,894,015 | B2 | 11/2014 | Contoret | |
| 8,965,409 | B2 | 2/2015 | Abhyanker | |
| 8,979,017 | B2 | 3/2015 | Zapata | |
| 9,002,754 | B2 | 4/2015 | Abhyanker | |
| 9,004,396 | B1 | 4/2015 | Colin et al. | |
| 9,022,324 | B1 | 5/2015 | Abhyanker | |
| 9,037,516 | B2 | 5/2015 | Abhyanker | |
| 9,064,288 | B2 | 6/2015 | Abhyanker | |
| 9,070,101 | B2 | 6/2015 | Abhyanker | |
| 9,071,367 | B2 | 6/2015 | Abhyanker et al. | |
| 9,098,545 | B2 | 8/2015 | Abhyanker | |
| 9,171,479 | B2 | 10/2015 | Martin et al. | |
| 9,373,149 | B2 | 6/2016 | Abhyanker | |
| 9,439,367 | B2 | 9/2016 | Abhyanker | |
| 9,441,981 | B2 | 9/2016 | Abhyanker | |
| 9,451,020 | B2 | 9/2016 | Liu et al. | |
| 9,457,901 | B2 | 10/2016 | Bertrand et al. | |
| 9,459,622 | B2 | 10/2016 | Abhyanker | |
| 9,561,850 | B2 | 2/2017 | Tsunekawa et al. | |
| 9,637,238 | B2 | 5/2017 | Wypyszynski | |
| 9,834,305 | B2 | 12/2017 | Taylor et al. | |
| 9,849,980 | B2 | 12/2017 | Li | |
| 9,880,563 | B2 | 1/2018 | Fisher et al. | |
| 9,944,393 | B1 | 4/2018 | Lorence | |
| 9,963,227 | B2 | 5/2018 | Tsunekawa et al. | |
| 9,971,985 | B2 | 5/2018 | Abhyanker | |
| 9,977,435 | B2 | 5/2018 | Fisher et al. | |
| 9,987,506 | B2 | 6/2018 | Marcus | |
| 10,000,284 | B1 | 6/2018 | Purwin et al. | |
| 10,107,196 | B2 | 10/2018 | Devine | |
| 10,112,713 | B2 * | 10/2018 | Tyler | B64D 17/40 |
| 10,124,880 | B1 | 11/2018 | Ellzey et al. | |
| 10,239,615 | B2 | 3/2019 | Duru | |
| 10,336,470 | B2 | 7/2019 | Fisher et al. | |
| 10,345,818 | B2 | 7/2019 | Sibley et al. | |
| 10,364,028 | B1 | 7/2019 | Wilhour | |
| 10,379,424 | B2 | 8/2019 | Lozovsky | |
| 10,464,668 | B2 | 11/2019 | Evulet | |
| D892,222 | S | 8/2020 | Levy | |
| D892,223 | S | 8/2020 | Levy | |
| D892,224 | S | 8/2020 | Levy | |
| 10,793,271 | B2 | 10/2020 | Demonfort | |
| 10,830,562 | B2 | 11/2020 | Himmelmann | |
| 10,850,866 | B2 | 12/2020 | Fisher et al. | |
| 10,858,101 | B2 | 12/2020 | Zapata | |
| 10,875,658 | B2 | 12/2020 | Evulet | |
| 10,912,977 | B1 | 2/2021 | Fuller | |
| 10,974,823 | B2 | 4/2021 | Van Niekerk et al. | |
| 11,001,378 | B2 | 5/2021 | Evulet | |
| 11,021,266 | B2 | 6/2021 | Fisher et al. | |
| 11,097,177 | B1 | 8/2021 | Fuller | |
| 11,142,523 | B2 | 10/2021 | Davenport et al. | |
| 11,148,801 | B2 | 10/2021 | Evulet | |
| 11,279,482 | B2 | 3/2022 | Browning | |
| 11,453,479 | B2 | 9/2022 | Zapata | |
| 11,479,345 | B2 | 10/2022 | Charron et al. | |
| 11,661,185 | B2 | 5/2023 | Bernard et al. | |
| 11,667,965 | B2 | 6/2023 | Porreca et al. | |
| 11,679,879 | B2 | 6/2023 | Baharav et al. | |
| 11,679,885 | B2 | 6/2023 | Browning | |
| 11,680,284 | B2 | 6/2023 | Gore et al. | |
| 11,702,203 | B2 | 7/2023 | Mckeehan et al. | |
| 11,718,390 | B2 | 8/2023 | Sinusas et al. | |
| 11,745,877 | B2 | 9/2023 | Lin | |
| 11,768,200 | B2 | 9/2023 | Porreca et al. | |
| D1,001,713 | S | 10/2023 | Gouverneur | |
| 11,787,537 | B2 | 10/2023 | Sinha et al. | |
| 11,807,356 | B2 | 11/2023 | Arsentyev et al. | |
| 11,814,185 | B2 | 11/2023 | Hehn et al. | |
| 11,820,507 | B2 | 11/2023 | Raptopoulos et al. | |
| 11,827,344 | B2 | 11/2023 | Truong et al. | |
| 11,840,730 | B1 | 12/2023 | Porreca et al. | |
| 11,845,548 | B2 | 12/2023 | Cruzada | |
| 11,851,178 | B2 | 12/2023 | Beck | |
| 11,866,168 | B2 | 1/2024 | Cooper et al. | |
| 11,878,805 | B2 | 1/2024 | Hines | |
| 2002/0003188 | A1 * | 1/2002 | Moshier | B64C 39/026 244/4 R |
| 2002/0113165 | A1 | 8/2002 | Moshier | |
| 2006/0192047 | A1 * | 8/2006 | Goossen | B64C 29/0016 244/17.23 |
| 2007/0290097 | A1 * | 12/2007 | Ishiba | B64C 29/0025 244/12.1 |
| 2008/0014811 | A1 | 1/2008 | Zeyger | |
| 2008/0142644 | A1 * | 6/2008 | O'Roark | B64C 39/026 244/4 A |
| 2009/0020654 | A1 * | 1/2009 | Tyler | B64C 39/026 244/23 A |
| 2012/0097801 | A1 | 4/2012 | Barrett | |
| 2012/0298790 | A1 | 11/2012 | Bitar | |
| 2013/0203306 | A1 | 8/2013 | Zapata | |
| 2013/0206915 | A1 | 8/2013 | Desaulniers | |
| 2014/0196650 | A1 | 7/2014 | Zapata | |
| 2015/0197337 | A1 * | 7/2015 | Tsunekawa | B64C 27/20 244/23 A |
| 2016/0123182 | A1 * | 5/2016 | Samaritano | B64C 27/08 416/43 |
| 2016/0340035 | A1 | 11/2016 | Duru | |
| 2017/0073070 | A1 | 3/2017 | Xing | |
| 2017/0080997 | A1 | 3/2017 | Zapata | |
| 2017/0361929 | A1 | 12/2017 | Demonfort | |
| 2018/0029703 | A1 * | 2/2018 | Simon | B64C 27/10 |

(56) References Cited

U.S. PATENT DOCUMENTS

| | | | |
|---|---|---|---|
| 2018/0127094 A1 | 5/2018 | Zapata | |
| 2019/0161188 A1 | 5/2019 | Zapata | |
| 2019/0202559 A1* | 7/2019 | Levy | B64C 11/001 |
| 2020/0023970 A1* | 1/2020 | Bitar | B64C 39/026 |
| 2020/0207474 A1* | 7/2020 | Foggia | G05D 1/0676 |
| 2021/0171188 A1 | 6/2021 | Charron et al. | |
| 2022/0355922 A1 | 11/2022 | Filho | |
| 2023/0356839 A1 | 11/2023 | Bitar | |

OTHER PUBLICATIONS

"Electric Jet Aircraft EJ-1S", Electric VTOL News, Retrieved on Sep. 12, 2023, Retrieved from: https://evtol.news/electric-jet-ej-1/, 56 pgs.

"Electric Jet Aircraft is creating electric jet turbine propulsion systems for personal flight and UAS systems to provide solutions to a variety of industries and applications", Electric Jet Aircraft, Retrieved on: Sep. 11, 2023, Retrieved from: https://electricjetaircraft.com/.

Hart, Matthew, "This Electric Jetpack Just Completed its First Test Flight", Nerdist, Jun. 4, 2021, Retrieved from: https://nerdist.com/article/electric-jetpack-first-test-flight/, 4 pgs.

Smith, Mat, "I flew, ever so briefly, with a jet suit", Engadget, Jul. 13, 2021, Retrieved from: https://www.engadget.com/gravity-industries-jet-suit-test-impressions-future-lab-festival-of-speed-160009551.html, 12 pgs.

Zyga, Lisa, "Company to sell 'world's first practical jetpack' for $75,000 (w/ Video)", Phys.org, Mar. 9, 2010, Retrieved from: https://phys.org/news/2010-03-company-world-jetpack-video.html, 2 pgs.

* cited by examiner

MODULAR MOBILITY SYSTEM INCLUDING THRUSTERS MOVABLY CONNECTED TO A SUPPORT STRUCTURE

CROSS-REFERENCE TO RELATED APPLICATIONS

The current application is a continuation of U.S. Non-Provisional application Ser. No. 18/180,756, entitled "Modular Mobility System", filed Mar. 8, 2023, which claims priority under 35 U.S.C. 119(e) to U.S. Provisional Patent Application Ser. No. 63/269,162, entitled "Modular Mobility System", filed Mar. 10, 2022, the disclosures are hereby incorporated herein by reference in their entirety.

FIELD OF THE INVENTION

The present invention generally relates to air transport systems. More specifically, all terrain transport systems with modular adaptability for a variety of uses, including human transport.

BACKGROUND

Humans have continued to innovate in new systems and methods to obtain personal flight. Some such systems have included a variety of different types of aircraft including multi-rotor aircraft and fixed winged aircraft. Personal transportation devices have also included single person vehicles to multi-passenger vehicles in a number of different configurations. Some of which have included vehicles with traditional fuel systems as well as electrically powered systems. Some developers have attempted to make hybrid systems that combine more traditional fuel systems with electrical ones as well as combined uses of multiple rotors and fixed wings. The continued development of personal transportation devices has led to the development of such devices as jetpacks that can be worn by an individual. However, many such devices rely on traditional fuel systems that carry specific safety concerns as well as lack the ability to adapt.

Although some developments have led to smaller and more compact personal transportation systems, many implementations lack feasible and cost-effective solutions for real world applications.

SUMMARY OF THE INVENTION

Many embodiments are directed to an all-terrain modular mobility system capable of moving a desired payload over a distance. The modular mobility system can have a number of different thrusters to generate vertical thrust as well as thrust vectoring to control the system while in flight. Some embodiments may incorporate fixed elements for longer sustained horizontal flight. In various embodiments, the power system can consist of modular electrical components that allow for adaptation depending on the terrain, environment, and/or mission requirements.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following FIGURES, which are presented as exemplary embodiments of the invention and should not be construed as a complete recitation of the scope of the invention, wherein.

DETAILED DESCRIPTION

Turning now to the drawings, systems and methods for an all-terrain modular mobility system are illustrated. Many embodiments of a modular mobility system have a frame structure that can be configured to support a plurality of energy storage elements. Each of the plurality of storage elements can be configured to provide power in order to operate a variety of propulsion devices. The propulsion devices can be electronically connected to the energy storage elements in a variety of manners including, but not limited to, power cables that can be flexible. In many embodiments, at least some of the propulsion devices can be manipulated in a number of axes in order to create a thrust vectoring for the mobility system. The thrust vectoring can thus allow the mobility system to maneuver while in flight.

Various transportation systems have been used to transport a number of things from human cargo to simple camera systems for data collection to other payloads. With the advancement of more efficient propulsion systems, personal transportation devices have captured the eye of many developers. For example, some personal taxi systems have been developed with a fuselage to carry the payload and a propulsion system. The overall systems tend to be similar to a helicopter with a rotary winged element and/or some fixed winged element.

Some of the prototypes have relied upon more traditional energy supply systems such as petrol-based fuel. However, the advancement of electrical technology has led to some developers creating fully electric vehicles. However, current battery technology presents various issues with scalability in terms of personal transportation systems. The current energy density of battery technology requires large battery banks or battery cells to provide sufficient energy to power the propulsion systems. Additionally, the large battery cells and larger propulsion systems typically require larger footprints. This can prove difficult to provide systems that are capable of sustained flight.

In contrast, the present invention is related to smaller individualized transportation systems that take advantage of modularity and adaptability as well as the current energy density available in electronic energy systems. The modularity of the various embodiments also allows for improved function over time as new developments arise with respect to higher energy density. Many such embodiments are directed toward a personal mobility system that can be worn by an individual or used as a transportation system to deliver any of a variety of different payloads.

Figure 1A:
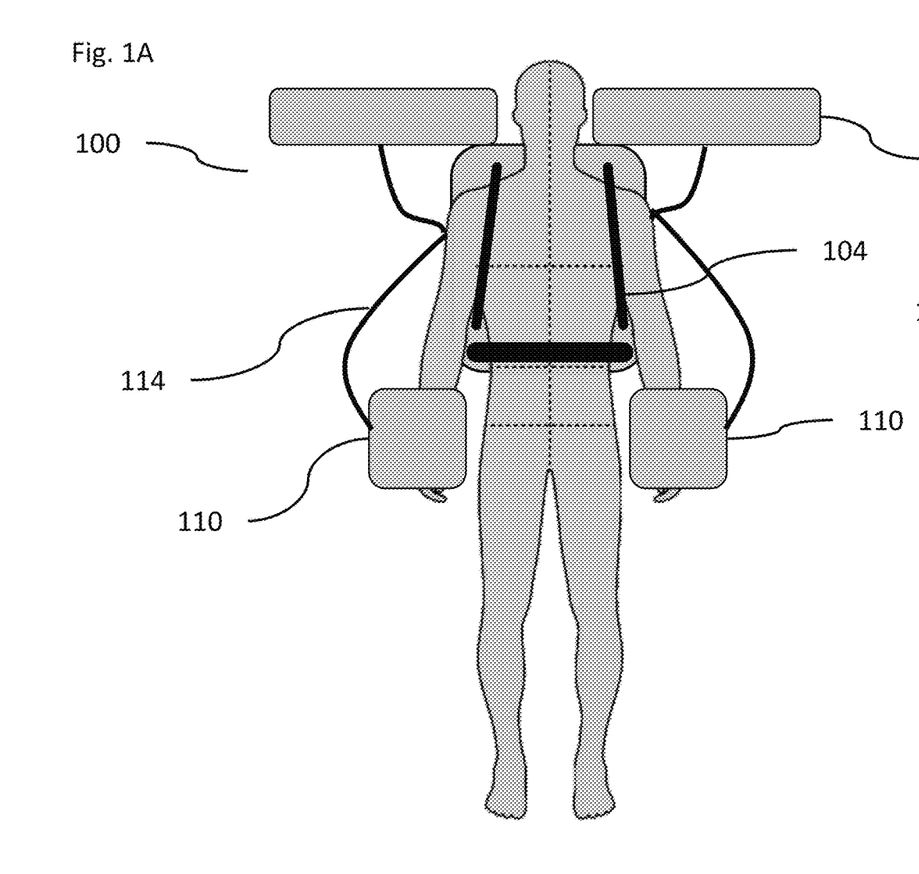
FIGS. 1A and 1B conceptually illustrate a personal mobility system in accordance with embodiments.
Figure 1B:
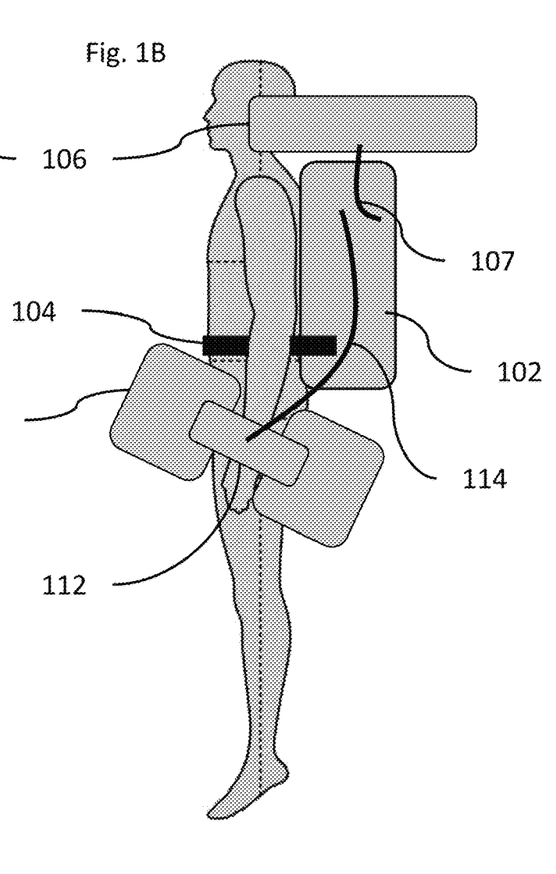

FIGS. 1A and 1B conceptually illustrate an embodiment of an all-terrain modular mobility system that can be worn by an individual. The modular mobility system 100, in numerous embodiments, can be powered by a power bank 102 that can be worn on the back of the individual much like a back pack. Although not illustrated in FIGS. 1A and 1B, the power bank can be connected and integrated with a framework that can be configured to support the weight of the power bank 102 as well as the payload. In various embodiments, the power bank 102 and/or the framework can be configured with straps or attachment devices 104 that can connect or attach the system to the individual user. The attachment devices 104 can take on any suitable form that would allow the user to support the system 100 on their back and still allow complete mobility of the user in flight and on the ground. The attachment devices 104, in some embodiments, may be a full harness system that supports the legs and the torso of the user. As can be appreciated, the attachment devices 104 can be adapted to accommodate any payload and not necessarily a person, but can be adapted to support equipment or any desirable payload.

In accordance with many embodiments, the modular mobility system 100 is designed to provide vertical thrust through the use of a number of different vertical thrusters 106. In accordance with various embodiments, the vertical thrusters 106 can be positioned near the top of the system 100 and remain in a fixed position such that the operation of the thrusters would provide a vertical thrust sufficient to provide lift to the system and the user. The vertical thrusters can be connected to the battery bank 102 by any number of electrical connections 107 such that the vertical thrusters 106 can draw power from the bank 102. In some embodiments the vertical thrusters are in a fixed position. In other embodiments, the vertical thrusters may be tilted at an angle such that the thrust generated can be both vertical and horizontal thrust. The primary function of the thrusters is to generate sufficient force to provide lift to the system 100 and payload, while the vertical thrusters 106 may also be configured to provide a secondary horizontal element when needed.

While the vertical thrusters 106 have a primary function to provide vertical thrust for the system, many embodiments can have one or more auxiliary thrusters 110. The auxiliary thrusters 110 can be configured to provide thrust vectoring. Thrust vectoring is a manner in which the overall thrust of the vehicle or system can be directed in such a way to redirect the movement of the vehicle. In many embodiments, the auxiliary thrusters 110 can be held by the users' hands such that the movement of the users' arms can direct the thrust from the auxiliary thrusters along any axis of movement. The auxiliary thrusters 110 can thus be used to generate a horizontal motion of the overall system. In order to help facilitate the overall function of the auxiliary thrusters 110, some embodiments may connect two or more auxiliary thrusters 110 through a handle 112 or other type of framework piece that connects the thrusters and allows the user to control the movement of the auxiliary thrusters.

Similar to the vertical thrusters 106, the auxiliary thrusters 110 can be powered by the onboard battery bank 102. Additionally, the auxiliary thrusters 110 can be connected to the battery bank by similar electrical connections 114. It should be understood that the electrical connections 114 for the auxiliary thrusters 110 can be flexible and adjustable such that they can allow the users to move the auxiliary thrusters 110 in any direction needed for flight. Additionally, the adjustability of the connections 114 can allow for different sized users to operate the mobility system without significant modifications to the overall system.

Figure 2A:
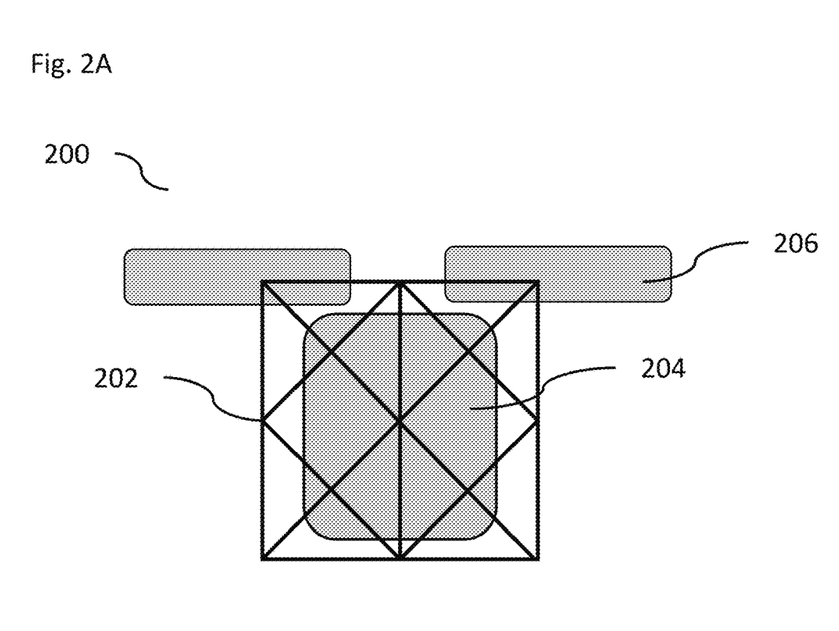
FIGS. 2A and 2B conceptually illustrate a mobility system in accordance with embodiments.
Figure 2B:
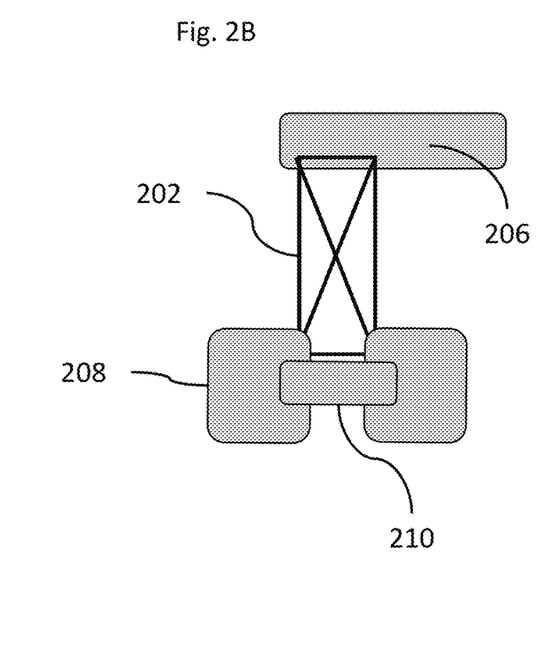

As previously described with respect to FIGS. 1A and 1B, some embodiments of a modular mobility system can be constructed using a framework to support the various other components. For example, FIGS. 2A and 2B illustrate components of a modular mobility system 200 that has a framework 202 structure. The framework structure 202 can be configured to support or be integrated with components such as a power supply 204 and vertical thrusters 206. The framework 202 can also be capable of supporting auxiliary thrusters 208. The auxiliary thrusters 208 can be positioned on the framework 202 at a location lower than that of the vertical thrusters 206. As can be illustrated, the auxiliary thrusters 208 can be interconnected by a handle 210 or other structural support mechanism. Additionally, the auxiliary thrusters 208 can be configured to mount to the sides of the framework such that they are fully supported by the framework 202. As can be appreciated, the auxiliary thrusters can be moveable in that they can be rotated while being connected to the framework 202. Additionally, the auxiliary thrusters 208 can be removed from the framework 202 when not in use or when they are being used by an individual. The auxiliary thrusters 208 can be secured to the framework when being stored. As such, many embodiments of the mobility system can allow for modular adaptation depending on the desired use. As can be appreciated, the framework 202 can take on any suitable form and be made from any suitable material. For example, in some embodiments the framework can be form fitting or configured to fit around the body of the user. Additionally, in some embodiments, the framework 202 can be adjustable to adjust the size and configuration to fit the individual user and/or the desired payload. Various embodiments of the framework can be constructed of materials such as metal, plastic, and/or composite.

Figure 3A:
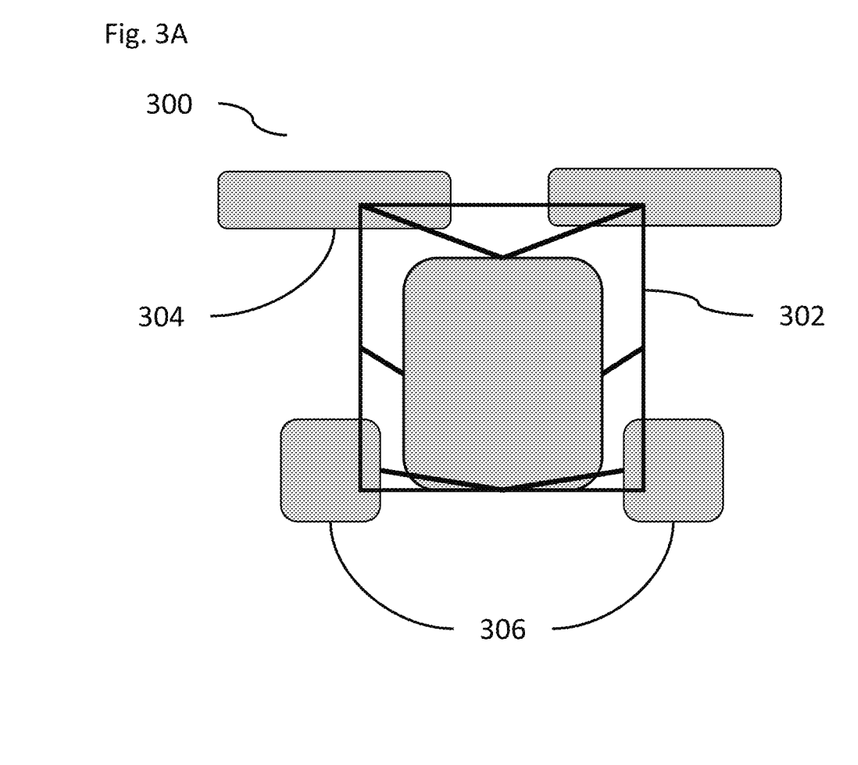
FIGS. 3A and 3B conceptually illustrate components of a mobility system in accordance with embodiments.
Figure 3B:
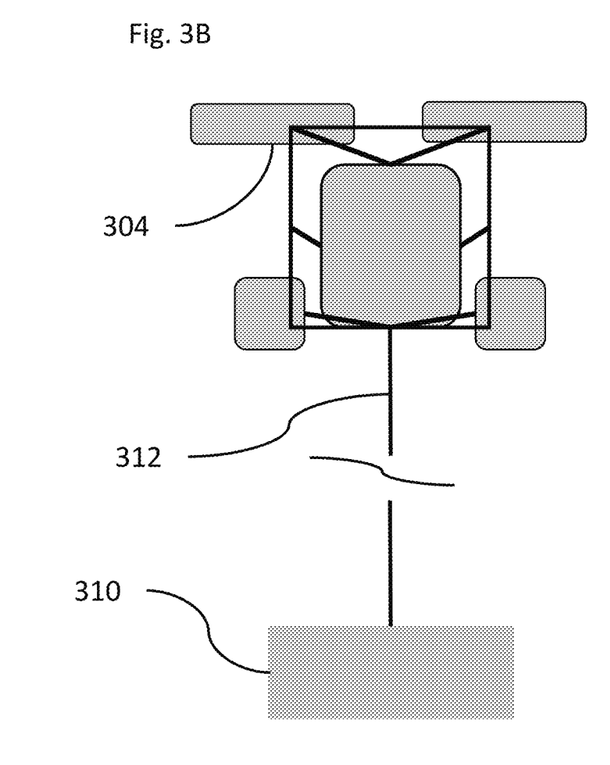

With the described modularity of the various embodiments of the mobility system, it should be understood that some embodiments can be adapted to operate without a human payload. For example, FIGS. 3A and 3B illustrate an embodiment of a mobility system that is configured to fly without a payload (3A) or with a tethered payload (3B). FIG. 3A illustrates an embodiment of a modular mobility system 300 with a framework 302 and a number of different vertical thrusters 304. The vertical thrusters 304, as with other embodiments, can be configured to generate enough vertical thrust for the mobility system 300 to obtain flight. In various embodiments, the system 300 can also be equipped with fixed or rotatable auxiliary thrusters 306. The auxiliary thrusters 306 in unmanned embodiments can be affixed to the frame in a number of ways that allow them to move or rotate such that they can provide thrust vectoring such that the system 300 can maneuver over any terrain. As such, the system 300 can be navigated both vertically and horizontally.

FIG. 3B illustrates an embodiment of the mobility system 300 that is configured to transport a separate payload 310. In such embodiments, the payload 310 can be connected to the system 300 by a tether 312 or other attachment device. Although not illustrated, the payload 312 can also be attached directly to the framework 302 by any suitable attachment mechanism such that it is not tethered. This can be helpful for longer missions when tethered payloads can affect the aerodynamics of the vehicle during travel.

Although various embodiments of a mobility system have been discussed primarily with respect to vertical flight and thrust vectoring for maneuvering, some embodiments of a mobility system can be configured for longer sustained horizontal flight. For example, FIG. 4 through FIG. 7 illustrate various views of embodiments of a mobility system adapted for sustained horizontal flight.

Figure 4:
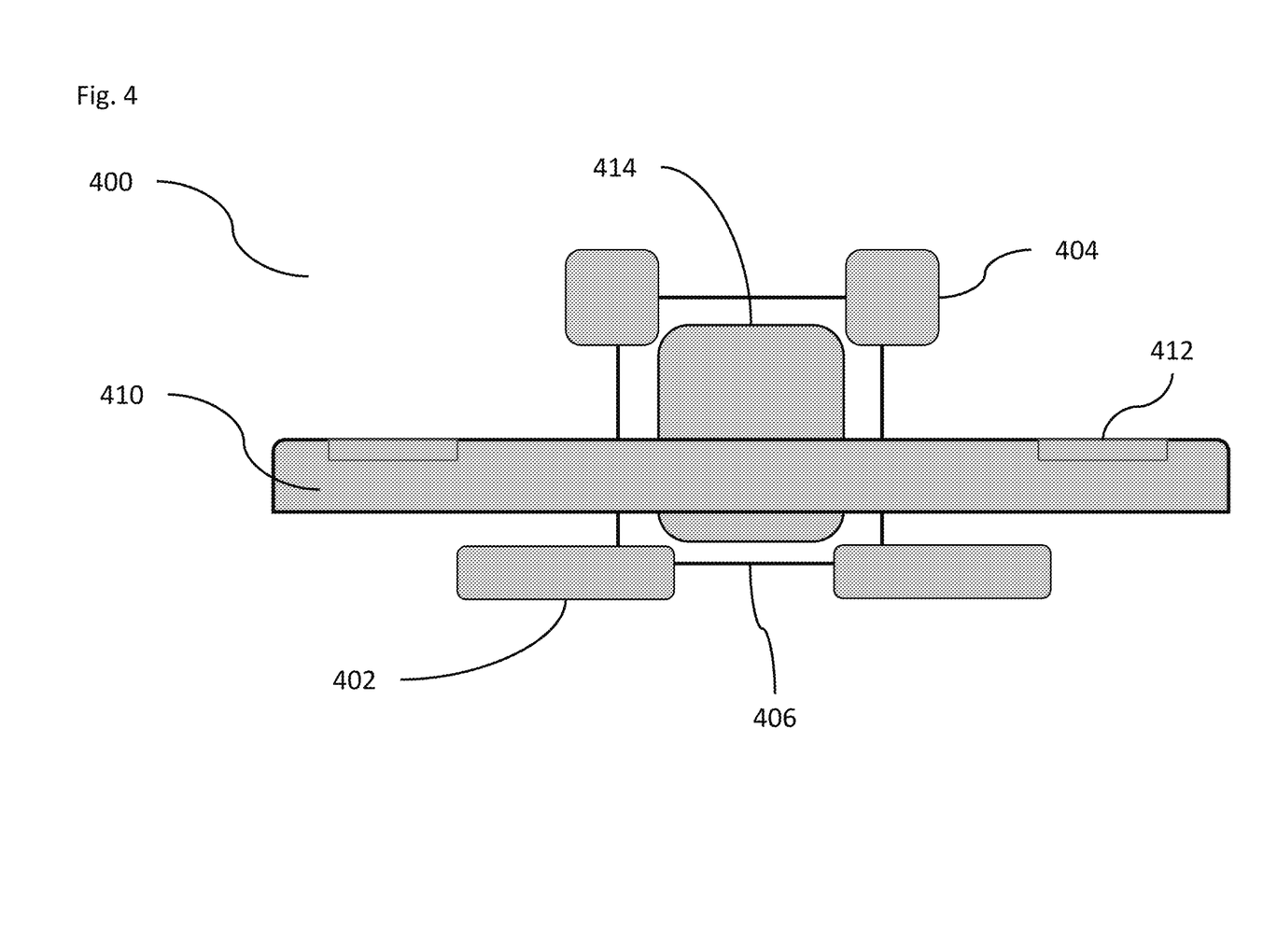
FIG. 4 conceptually illustrates a top view of a mobility system modified for horizontal flight in accordance with embodiments.

FIG. 4 illustrates a top view of a mobility system 400 with primary thrusters 402 and auxiliary thrusters 404 connected to a framework 406. Additionally, the mobility system is equipped with a fixed wing element 410 that can also be connected to the framework structure. The fixed wing element 410 can be an elongated air foil that is designed to produce lift when in horizontal flight. As can be appreciated, the mobility system 400 can be configured to begin flight in the vertical position where the main thrusters provide a vertical lift. The auxiliary thrusters 404 can then help to transition the mobility system into a horizontal flight pattern in which the fixed wing element 410 can produce the necessary lift for sustained flight. In some embodiments, the auxiliary thrusters can be used to provide the necessary horizontal thrust during horizontal flight which would subsequently require less power consumption and improve the flight time capabilities of the mobility system 400.

Other embodiments of the mobility system 400 can be configured to obtain flight from a horizontal initial position, similar to a traditional fixed wing aircraft. Accordingly, the main thrusters 402 can provide the necessary horizontal thrust to generate the lift from the fixed wing 410 to obtain vertical flight. From there, the auxiliary thrusters 404 can produce the necessary thrust to maintain flight. In many embodiments, the fixed wing element 410 can have a number of control surfaces 412 integrated into the wing element. The control surfaces can help adjust the pitch, roll, and yaw of the vehicle and allow the auxiliary thrusters to remain in a fixed position. The movement of the control surfaces would require far less energy than moving the auxiliary thrusters for thrust vectoring, thus increasing the flight time capabilities of the system 400 by reducing the energy needed to operate the thrusters. As with various other embodiments, the mobility system illustrated in FIG. 4 can be powered by an electronic power supply system 414 that can be adapted to accommodate a number of different configurations.

Figure 5A:
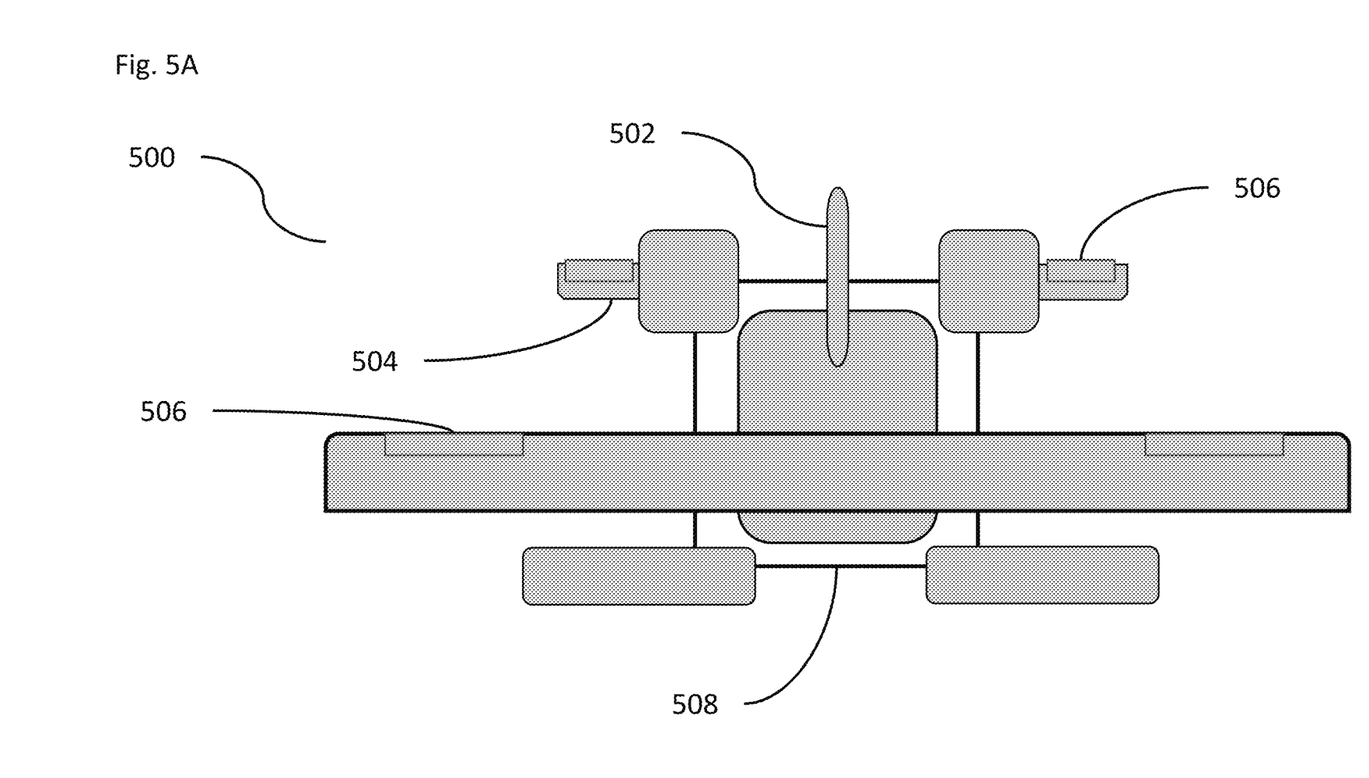
FIG. 5A though 5C conceptually illustrate various views of a mobility system with various control surfaces in accordance with embodiments.
Figure 5B:
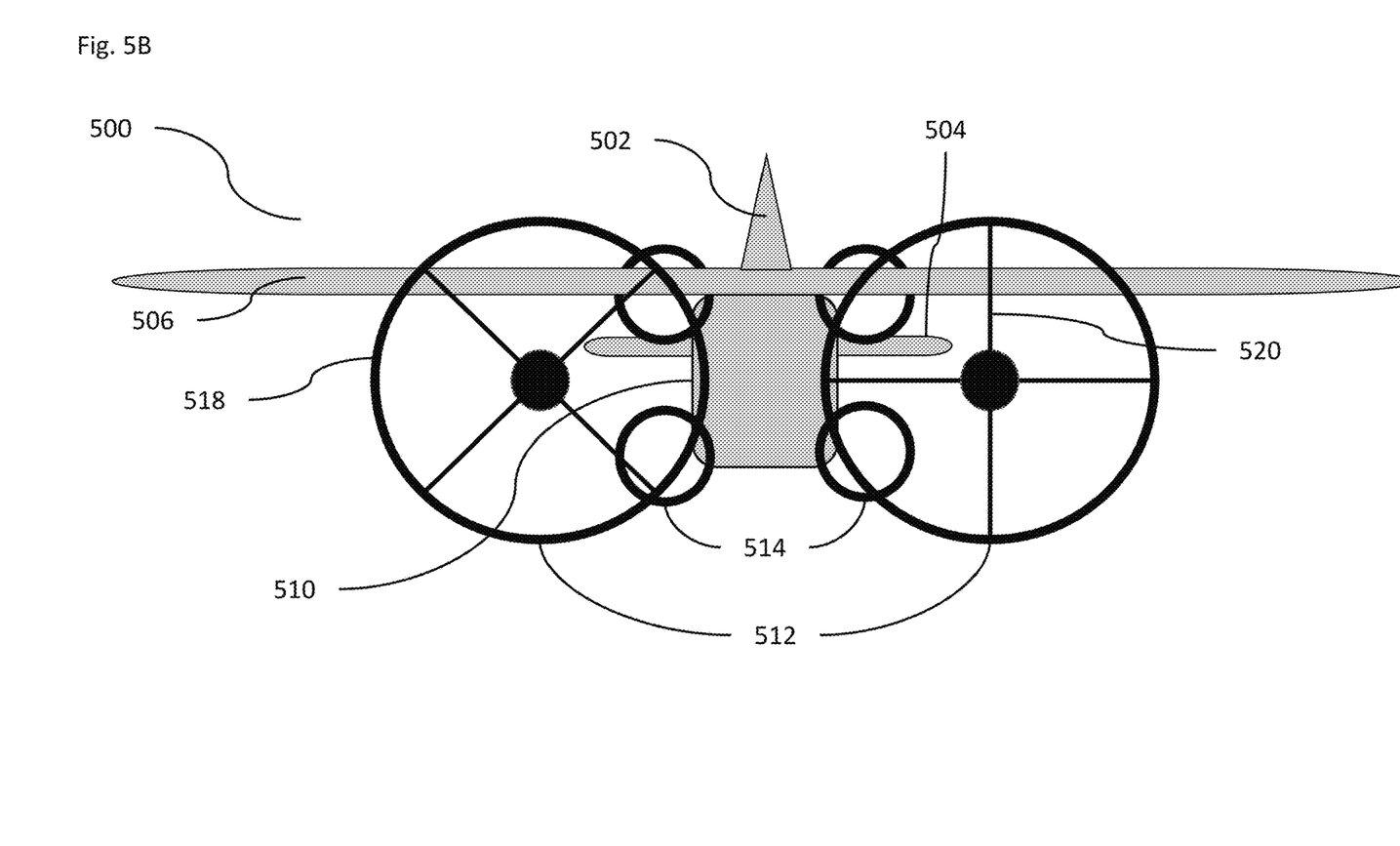
Figure 5C:
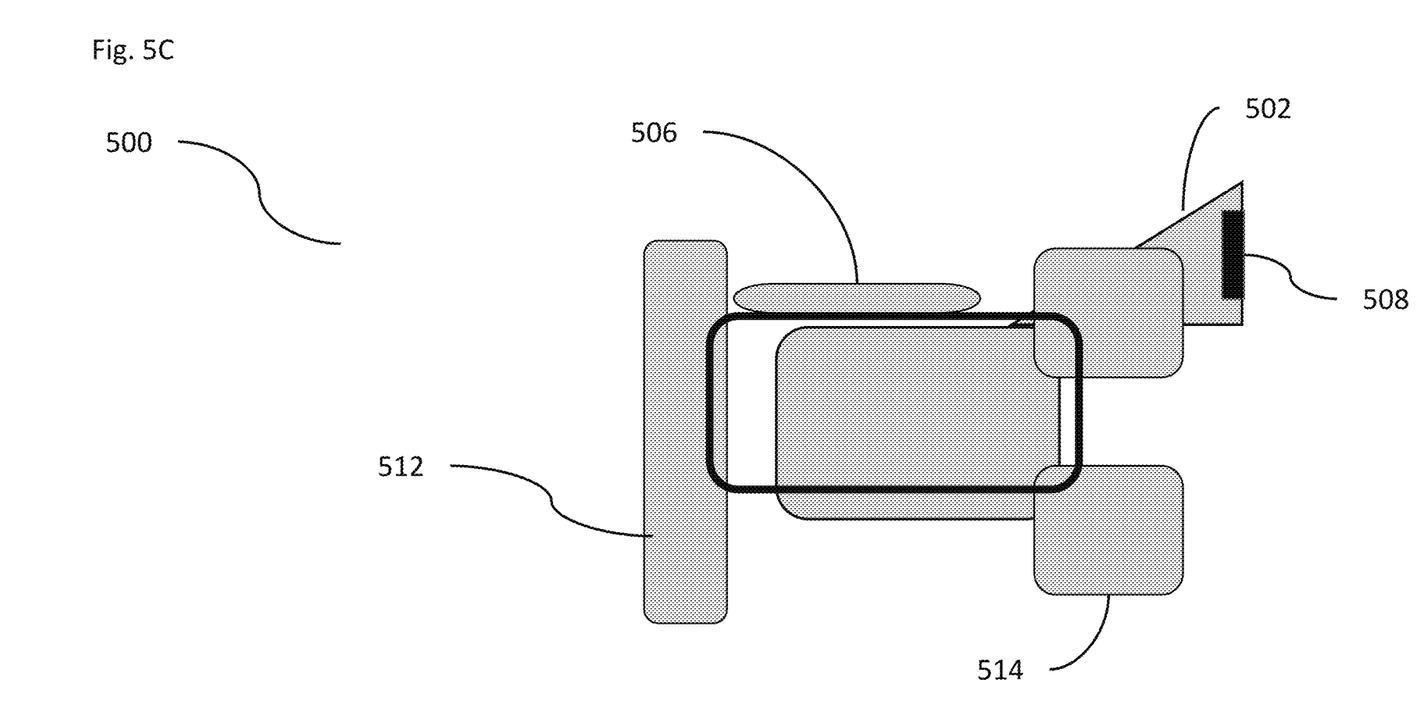

FIGS. 5A through 5C illustrate various views of a mobility system 500 with additional fixed elements to help stabilize and control the modular mobility system while in flight. For example, some embodiments of a mobility system 500 can be equipped with a tail fin or empennage 502 and one or more horizontal stabilizers 504 in conjunction with a fixed wing element 506. The tail fin 502 and the stabilizers 504 can have additional control surfaces 508 integrated into them to allow for improved control of the system 500 by controlling the pitch, yaw, and roll of the mobility system. FIG. 5C further illustrates the control surfaces 508 that can be integrated into the tail fin 502.

As can be appreciated, the various flight control elements can be connected to the framework 510 of the system 500 in a number of different ways. Additionally, each of the flight control elements can be removable such that the system can be converted to an alternative version as needed for the various mission parameters. For example, the fixed wing element 506 as well as the tail fin 502 and stabilizers 504 can be removed to resemble a configuration similar to that illustrated in FIGS. 1-4. As can be appreciated, some embodiments may also allow for the removal of all components, including the main thrusters 512 and the auxiliary thrusters 514 such that the system 500 can be easily stored or transported for later use. Accordingly, the components can all then be reattached in a number of different configurations depending on the desired mission requirements. Although not fully illustrated, it can be appreciated that the various components can be attached in a number of suitable ways to allow for fixed or adjustable positions.

FIG. 5B illustrates a front view of a mobility system similar to that shown in FIG. 5A where the system 500 is configured with at least two front main propulsion rotors 512 and a number of auxiliary rotors 514. Although the position and configuration of the various rotors are illustrated in a particular form, it can be appreciated that some embodiments may have various configurations. In some embodiments, the rotors (512 and 514) can have a shroud 518 that surrounds the rotor blades 520. The shroud can be configured to reduce noise from the blades 520 as well as help with the movement of air around the blades 520. This can be highly advantageous by reducing the overall noise or sound produced from the system during operation. Therefore, the modular mobility system 500 can operate in a stealth mode, which can provide an advantage for delivering equipment or personnel to any suitable location without detection. In some embodiments, the rotor blades 520 can be a fixed pitch to help simplify the overall design and reduce the risk of mechanical failure from moving parts.

Figure 6:
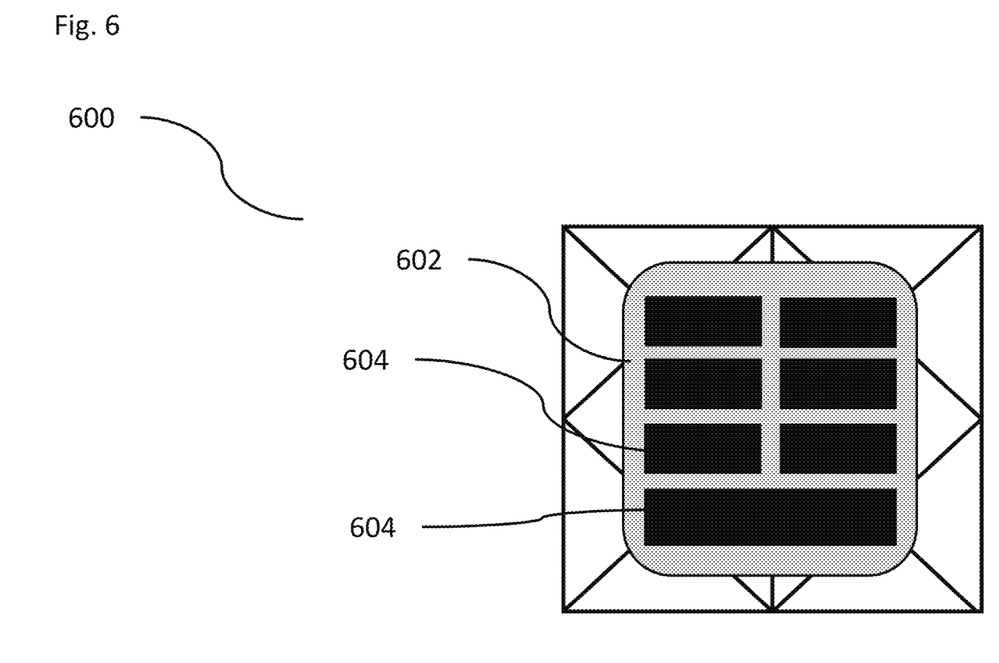
FIG. 6 conceptually illustrates a power supply subsystem in accordance with embodiments.

The modularity of the various embodiments of the mobility system can be carried throughout the overall design and in a number of different components. Much like the fixed wing elements can be removed and modified for different mission requirements, it should be understood that the power supply system can also be modular and adaptable. For example, FIG. 6 illustrates an embodiment of a power supply system 600 that can be used in a number of different configurations of modular mobility systems. The power supply system 600 can be constructed of a main body element 602 that can serve as a support structure for other components. The main body 602 can be configured to house a number of different energy storage devices 604 such as batteries. The energy storage devices 604 can be configured in any suitable way within the main body 602. Additionally, the energy storage devices 604 can be configured to be removed independently such that they can be replaced or repaired for ease of maintenance. Furthermore, as battery technology continues to evolve, the main body can be adapted to accept new, higher energy density devices to provide power to the mobility system. In various embodiments, the energy storage devices 604 can be connected in a number of different ways in order to provide the most efficient power supply to the various components of a mobility system. It should also be understood that the main body 602 can be configured to house energy storage devices 604 of different sizes.

As can be fully appreciated by the modularity of the various embodiments of mobility systems and the associated components can be used in a number of different environments and terrains. For example, the modularity of the systems can allow for use in mountainous terrains or over water. Additionally, many embodiments can be adapted for use in wet or dry environments. Embodiments of the energy storage systems and the associated connections can be sealed and water tight. Sealing the enclosures of a mobility system in this way can allow for the system to be used in rainy or moist environments without risk of damage to the electrical or mechanical systems. Likewise, the sealed systems can be used in dry desert like environments that can be subject to sand storms or other weather conditions that might expose the various components to corrosive debris. Additionally, the simplicity of the various thruster designs can offer improved longevity and sustainability in the various embodiments of the system due to their lack of complex moving parts. Furthermore, the modularity of the systems and components described herein offer greater adaptability and ease of use in any terrain and/or environment.

As can be appreciated, the control of the various embodiments of mobility systems can require unique solutions in order to enable safe flight operations. In the case of a human operator, training should be involved such that the system can be operated safely. Additionally, various embodiments may incorporate additional controllers that can be computer controlled to help the human operator have an interface with the various system components such that the operator can operate the mobility system safely. For example, some embodiments may have a controller that can communicate system component data such as battery life, rotor speed, distance, overall flight speed, estimated distance on battery left, etc. to a heads-up display worn by the controller. In some embodiments of the mobility system without a human operator, the system information can be transmitted to an offsite controller that can be a human or a computer system for controlling the flight of the vehicle.

Figure 7:
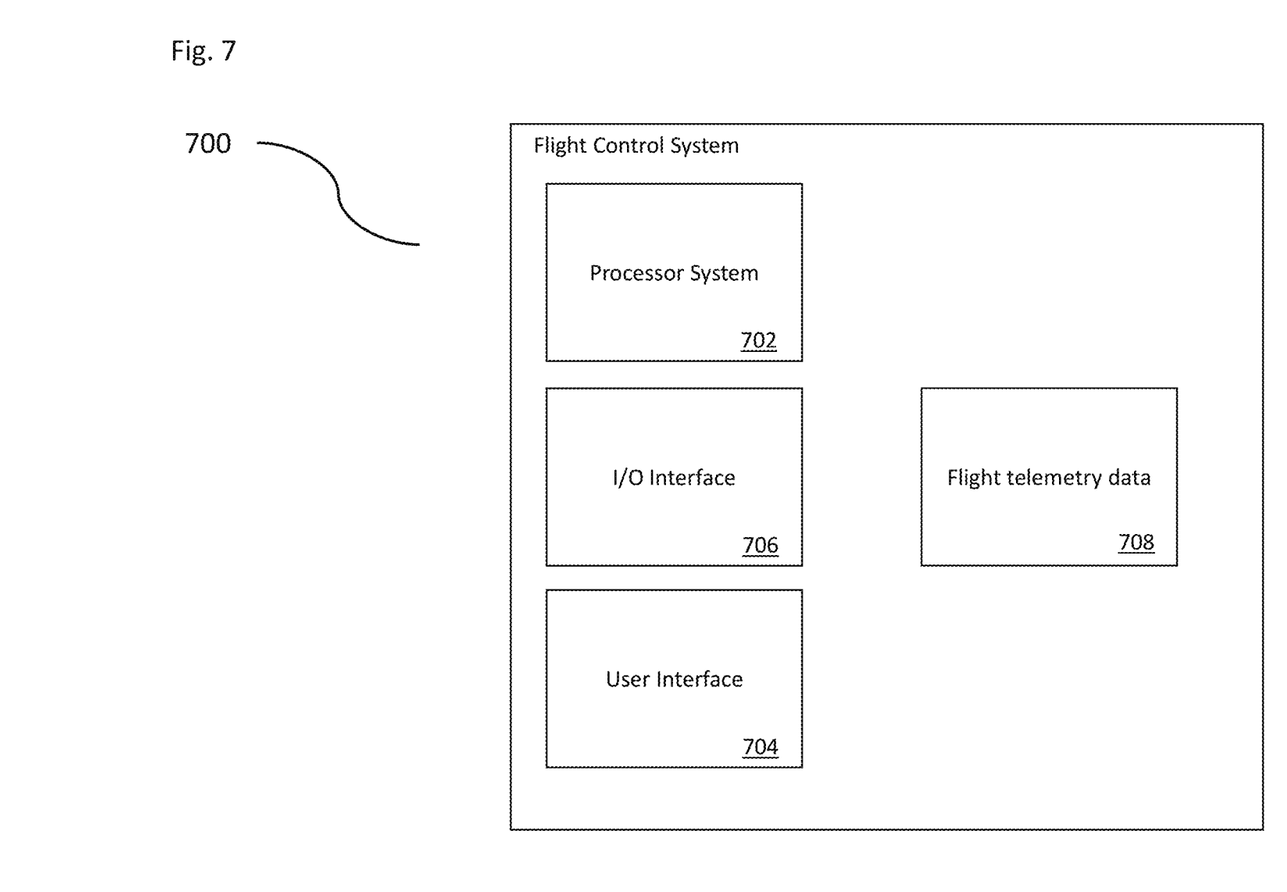
FIG. 7 conceptually illustrates a control system in accordance with embodiments.

FIG. 7 illustrates an embodiment of a control system that may be used in various embodiments of a mobility system. The control system 700 can have a processing unit 702 that processes the input data from the various components as well as the control inputs from a user interface 704. In some embodiments, the control system can have an input/output interface 706 that interconnects the various control system elements. The control can also be configured to receive flight telemetry data from the various rotors and control surfaces as well as other sensors through a data input cell 708. Additional information, like battery life and health can be input to the processor. The control system 700 can also be configured with an integrated flight management system that transmits data to the pilot (either on board or remote) to allow for improved flight control and adjustments as needed. This can prove critical as flight conditions can change in any given moment with weather or other external factors. Although not specifically illustrated in the figure, many embodiments can incorporate a number of different sensor systems such as cameras, lidar, radar, infrared, etc. that can be used as inputs for the control system 700 to help improve the overall control of the vehicle.

As can be fully appreciated, battery power and energy density can be an important component to mobility systems as described herein. At a minimum, the electric systems should be capable of providing 0.18 kilowatt-hours per Kg in order to sustain flight for any non-negligible amount of time. Many embodiments may be capable of incorporating energy storage elements with 0.18 kilowatt-hours per Kg or more. For example, some energy storage elements can have 0.21 kilowatt-hours per kg. As can be appreciated, the energy storage elements can be of any suitable type such as lithium batteries or any such device with the desired energy density of 0.18 kilowatt-hours per kg or higher. Electric energy can be relatively efficient and provide an environmentally advantageous solution to mobility systems. Additionally, electric systems can offer quieter systems for deployment in areas or missions that may require unique applications. As previously mentioned, the low noise emissions of the various embodiments can allow for more stealth-like or undetectable movement. This can be highly advantageous depending on the overall mission requirements and operational environment. It can be appreciated, that energy density of the power supply system can prove the greatest challenge to sustained flight. This can also be affected by the transported as well as the overall weight of the system. Accordingly, many embodiments described herein allow for adaptability to increase or adjust the energy supply system as well as adapt and update the power system with higher energy density components as well as lighter more agile components; thus, improving the overall efficiency of the system. Additionally, the efficiency of the system can be adjusted based on the mission requirements to allow for ingress and egress of various payloads without negatively affecting the outcome of the mission.

Figure 8A:
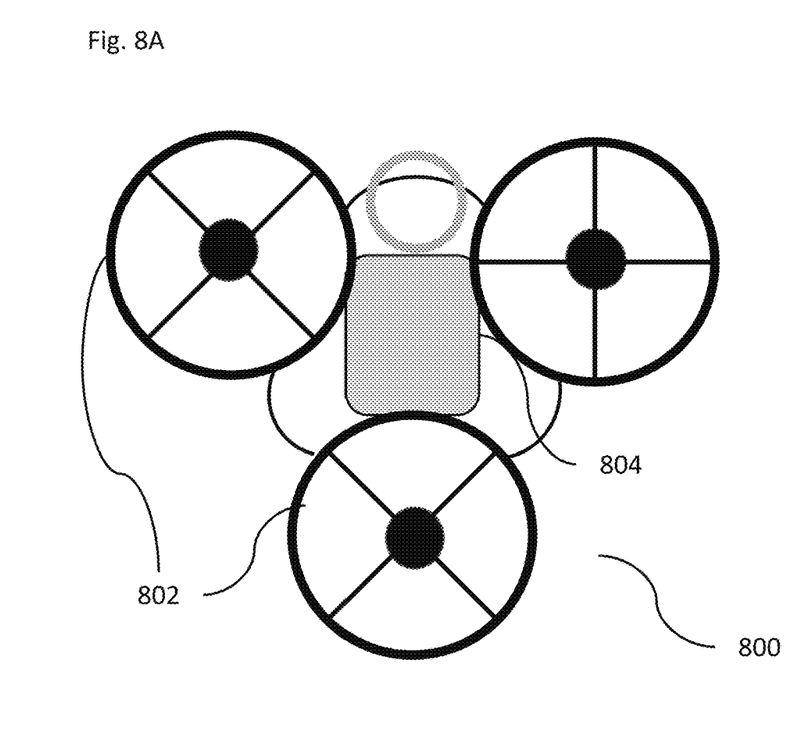
FIGS. 8A and 8B conceptually illustrate a modular mobility system with alternative configurations in accordance with embodiments.
Figure 8B:
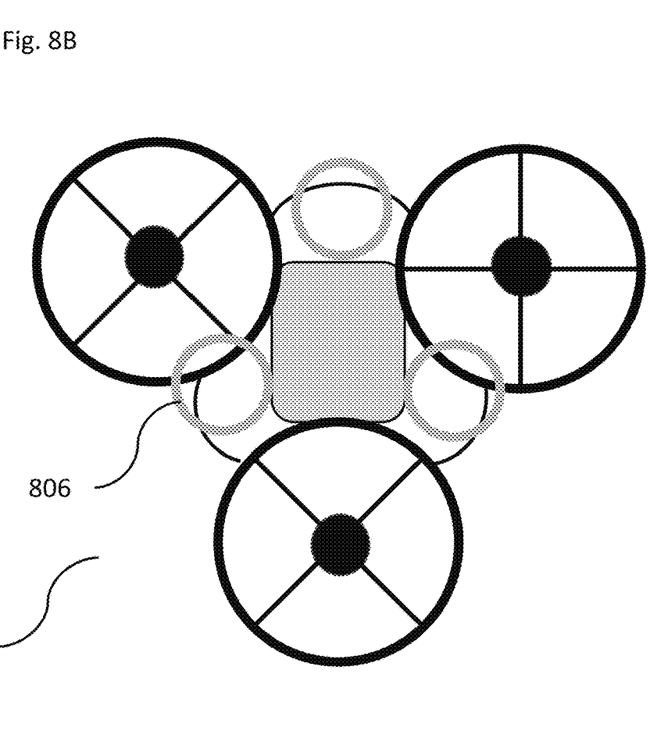
Figure 9A:
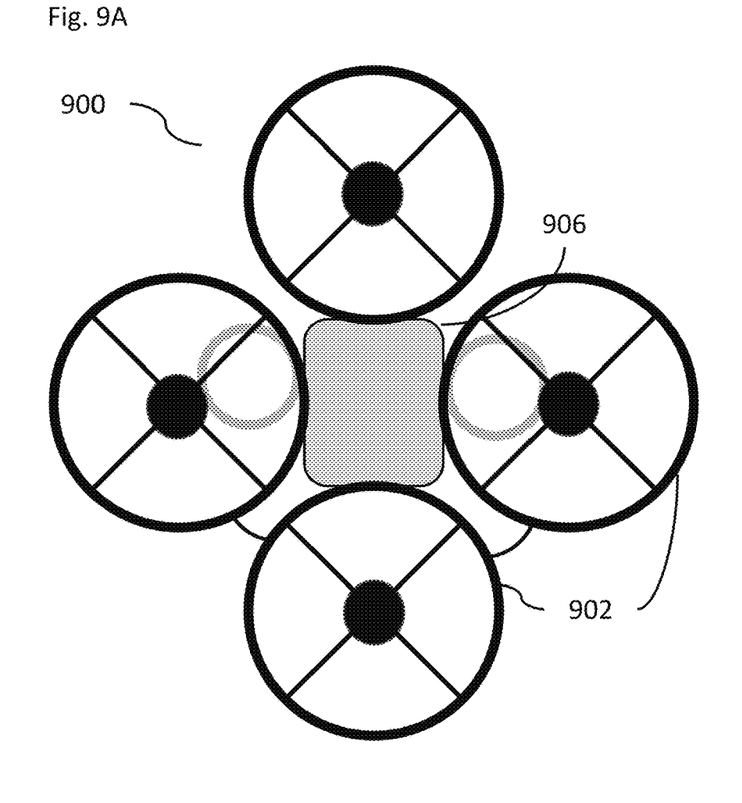
FIGS. 9A and 9B illustrate a mobility system with multiple configurations of thrusters in accordance with embodiments.
Figure 9B:
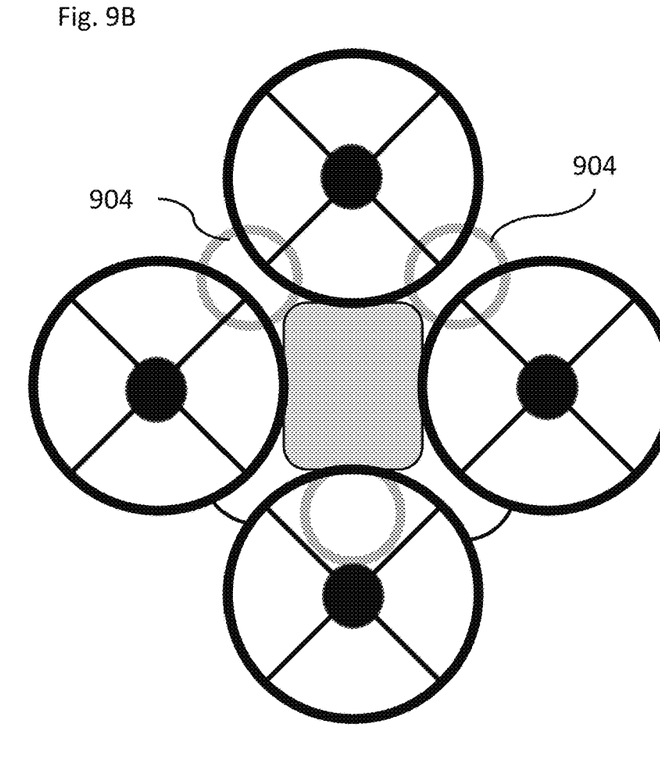

As can be fully appreciated from the discussion above, modularity and adaptability can be an important aspect of the various embodiments of the mobility systems and the various subsystems. Accordingly, FIGS. 8A through 9B illustrate other embodiments of modular mobility systems that can accommodate additional configurations of thrusters; both main thrusters and auxiliary thrusters. For example, FIGS. 8A and 8B illustrated a modular mobility system 800 with three main rotors 802 that can be connected to a support structure 804. The support structure 804 can be a housing for supporting the power systems and can be suited for carrying any type of desirable payload. Each of the main thrusters 802 can be interconnected for additional support or simply for electronic communication between the thrusters.

To assist in the directional movement of the mobility system 800, some embodiments can have a number of different auxiliary thrusters 806. FIG. 8B illustrates a system with only a single auxiliary thruster, while FIG. 8B illustrates an embodiment of a system with three auxiliary thrusters. It should be well understood that the number, type, and configuration of thrusters can vary depending on the mission requirements such as terrain and environment. Additionally, in numerous embodiments one or more of the thrusters can be added or removed and the other remaining thrusters can be reconfigured on the support structure thus changing the overall configuration and flight characteristics of the mobility system. This can be further illustrated in FIGS. 9A and 9B, wherein the mobility system 900 is configured with four main thrusters 902 and two or three auxiliary thrusters 904. Similar to other embodiments, the thrusters can all be arranged and connected to a support structure 906 that can vary in size and purpose depending on the mission and situation. It can be appreciated that the extensive modularity and adaptability of the mobility system can allow for use in an endless number of terrains and environments as well as carry a variety of different payloads.

SUMMARY & DOCTRINE OF EQUIVALENTS

As can be inferred from the above discussion, the above-mentioned concepts can be implemented in a variety of arrangements in accordance with embodiments of the invention. Specifically, the use of a modular mobility system for easy deployment of personnel and/or equipment through a number of different terrains and/or environments. Some embodiments may incorporate a number of different thrust generating devices that allow for thrust vectoring as well as vertical thrust. Other configurations can be adapted to accommodate longer, more sustained flights through fixed wing elements.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A modular mobility system comprising:
a support structure configured to carry at least one payload, where the support structure has a top, sides, and a bottom;
a plurality of vertical thrusters connected in a fixed position proximate the top of the support structure, where the plurality of vertical thrusters is capable of generating sufficient vertical thrust to provide lift to the system and the at least one payload;
a plurality of auxiliary thrusters movably connected to the sides of the support structure at a position lower than the plurality of vertical thrusters,
where the plurality of auxiliary thrusters are configured to be pivoted to direct thrust along a plurality of different axes while connected to the support structure so that each of the plurality of auxiliary thrusters is capable of being directionally controlled to generate thrust vectoring to control the pitch, yaw, and roll of the system; and
a modular power supply system connected to the support structure that comprises a plurality of removable battery packs that form a battery bank that is electrically connected to the plurality of vertical thrusters and the plurality of auxiliary thrusters via electrical connections, where the plurality of vertical thrusters and the plurality of auxiliary thrusters are configured to be powered by the battery bank.

2. The modular mobility system of claim 1, wherein the at least one payload is secured to the support structure by at least one of a harness, and a tether.

3. The modular mobility system of claim 1, wherein the electrical connections that electrically connect the battery bank to the plurality of vertical thrusters and the plurality of auxiliary thrusters are flexible and adjustable.

4. The modular mobility system of claim 1, wherein the auxiliary thrusters in the plurality of auxiliary thrusters are interconnected.

5. The modular mobility system of claim 1, where each of the plurality of auxiliary thrusters is configured to be removed from the support structure.

6. The modular mobility system of claim 1, wherein the support structure is adjustable.

7. The modular mobility system of claim 1, wherein the battery bank is capable of providing at least 0.18 kilowatt-hours per kilogram.

\* \* \* \* \*